United States Patent
Ootsuna et al.

(10) Patent No.: US 7,847,837 B2
(45) Date of Patent: Dec. 7, 2010

(54) IMAGINE PICKUP DEVICE AND IMAGINE PICKUP METHOD

(75) Inventors: Yoshinori Ootsuna, Yokohama (JP); Jyouji Wada, Yokohama (JP); Nobuhito Seki, Machida (JP)

(73) Assignee: Panasonic Corporation, Osaka (JP)

( * ) Notice: Subject to any disclaimer, the term of this patent is extended or adjusted under 35 U.S.C. 154(b) by 1107 days.

(21) Appl. No.: 10/578,820

(22) PCT Filed: Jan. 17, 2005

(86) PCT No.: PCT/JP2005/000483

§ 371 (c)(1),
(2), (4) Date: May 9, 2006

(87) PCT Pub. No.: WO2005/069604

PCT Pub. Date: Jul. 28, 2005

(65) Prior Publication Data

US 2007/0085915 A1    Apr. 19, 2007

(30) Foreign Application Priority Data

Jan. 19, 2004    (JP) .............................. 2004-010115

(51) Int. Cl.
*H04N 5/262* (2006.01)
*H04N 5/222* (2006.01)
(52) U.S. Cl. .............................. 348/240.1; 348/333.01
(58) Field of Classification Search ... 348/204.1–240.3, 348/333.01, 333.05, 333.11, 360, 361; 396/73–75
See application file for complete search history.

(56) References Cited

U.S. PATENT DOCUMENTS 6,559,888 B1 * 5/2003 Doron ..................... 348/240.1

FOREIGN PATENT DOCUMENTS

| EP | 1 220 001 A1 | 7/2002 |
|----|---|---|
| JP | 61-045684 | 3/1986 |
| JP | 3-23034 | 3/1991 |
| JP | 2001051183 A * | 2/2001 |
| JP | 2001-100085 | 4/2001 |
| JP | 2001-186401 | 7/2001 |
| JP | 2002-77717 | 3/2002 |

OTHER PUBLICATIONS

European Search Report dated Jul. 7, 2009.

* cited by examiner

*Primary Examiner*—Timothy J Henn
(74) *Attorney, Agent, or Firm*—Pearne & Gordon LLP

(57) ABSTRACT

An image pickup device has an image pickup element (20), a variable power lens (20) for changing image pickup magnification, a magnification converting lens (15) for converting the image pickup magnification into a predetermined multiple, a signal processing circuit (30) for outputting a signal from the image pickup element (20) as a picture image signal, an image recording section (31) for recording an image, and a control section (40). The signal processing circuit (30) outputs the image recorded to the image recording section (31) to a monitor when the magnification converting lens (15) is inserted onto an optical axis L. At the inserting time of the magnification converting lens, it is possible to prevent that a frame body of the magnification converting lens is displayed in the monitor.

11 Claims, 10 Drawing Sheets

FIG. 9A                                    PRIOR ART
— 62
FIG. 9B                                    PRIOR ART
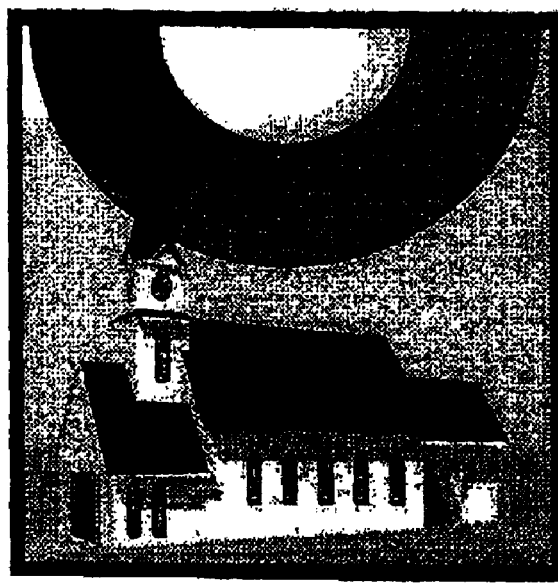
— 61
— 62

62

IMAGINE PICKUP DEVICE AND IMAGINE PICKUP METHOD

TECHNICAL FIELD

The present invention relates to an image pickup device (or imaging device or photographing device) able to insert and detach a magnification converting lens on the optical axis of a variable power lens.

BACKGROUND ART

A conventional image pickup device has an extender as the magnification converting lens to pick up an image of high magnification as well as the variable power lens. The magnification converting lens is inserted on the same optical axis as the variable power lens, and the focal distance of the lens is discontinuously changed. As described in JP-A-2001-100085, when the focal distance of the variable power lens is insufficient in the conventional image pickup device, the above extender is inserted on the optical axis, and the focal distance is extended and a distant subject is photographed and displayed in a monitor. FIGS. 9A to 9C show the monitor display of an extender inserting process. FIG. 9A shows the subject displayed in the monitor 62 before the insertion of the extender. The extender is inserted as shown in FIG. 9B and the subject displayed in the monitor 62 is enlarged by using the extender as shown in FIG. 9C.

When the extender is inserted in the conventional image pickup device, the extender crosses an optical path between the variable power lens and an image pickup element. Accordingly, as shown in FIG. 9B, a frame body 61 of the extender is displayed in the monitor 62. This gives a disordered feeling to a user seeing the monitor 62.

DISCLOSURE OF THE INVENTION

Problems that the Invention is to Solve

An object of the present invention is to provide an image pickup device which do not give a disordered feeling to the user seeing the monitor when the extender is inserted.

Means for Solving the Problems

An aspect of the present invention relates to an image pickup device. This image pickup device comprises an image pickup element; a variable power lens arranged on the same optical axis as the image pickup element and changing image pickup magnification; a magnification converting lens arranged so as to be inserted and detached on the optical axis and converting the image pickup magnification into a predetermined multiple; a signal processing circuit for outputting a signal from the image pickup element as a picture image signal; an image recording section for recording an image; a control section for performing control for inserting and detaching the magnification converting lens on the optical axis; wherein the signal processing circuit outputs the image recorded to the image recording section when the magnification converting lens is inserted onto the optical axis.

Another aspect of the present invention relates to an image pickup method. This image pickup method comprises a step for inserting and mounting a magnification converting lens for converting image pickup magnification into a predetermined multiple on the optical axis of an image pickup element and a variable power lens; a step for recording a picture image signal from a signal processing circuit to an image recording section as an image; and a step for switching a picture image from the image pickup element to the image recorded to the image recording section and outputting the switched image; wherein the image of the image recording section is outputted when the magnification converting lens is inserted onto the optical axis.

As explained below, other aspects exist in the present invention. Accordingly, in the disclosure of this invention, the provision of a aspect of one portion of the present invention is intended, and it is not intended to limit the scope of the invention described here and claimed.

BRIEF DESCRIPTION OF THE DRAWINGS

FIG. 9A is a view showing monitor display in a conventional image pickup device.

FIG. 9B is a view showing monitor display in the conventional image pickup device.

Figure 1:
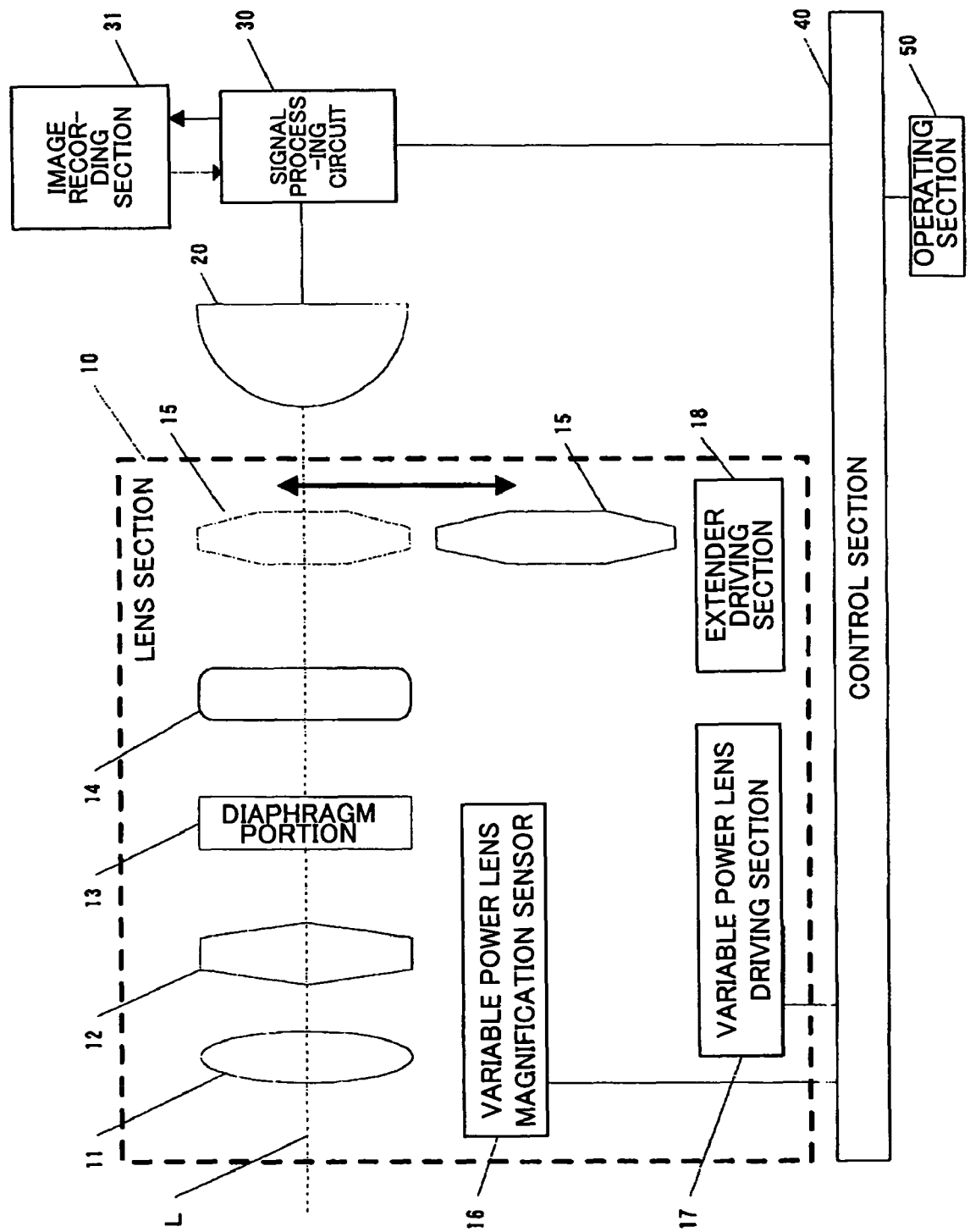
FIG. 1 is a block diagram of an image pickup device of an embodiment of the present invention.

DESCRIPTION OF THE REFERENCE NUMERALS AND SIGNS 10 lens section
11 first group lens
12 variable power lens
13 diaphragm portion
14 focus lens
15 extender
16 variable power lens magnification sensor
17 variable power lens driving section
18 extender driving section
20 image pickup element
30 signal processing circuit
31 image recording section
40 control section
50 operating section
61 frame body of extender
62 monitor
L optical axis of image pickup element

BEST MODE FOR CARRYING OUT THE INVENTION

A detailed explanation of the present invention will next be described. However, the following detailed explanation and accompanying drawings do not limit the invention. Instead, the scope of the invention is prescribed by the appended claims.

In this embodiment, an image pickup device comprises an image pickup element; a variable power lens arranged on the same optical axis as the image pickup element and changing image pickup magnification; a magnification converting lens arranged so as to be inserted and detached on the optical axis and converting the image pickup magnification into a predetermined multiple; a signal processing circuit for outputting a signal from the image pickup element as a picture image signal; an image recording section for recording an image; a control section for performing control for inserting and detaching the magnification converting lens on the optical axis; wherein the signal processing circuit outputs the image recorded to the image recording section when the magnification converting lens is inserted onto the optical axis.

It is possible to prevent a frame body of the magnification converting lens from being displayed in a monitor by this construction when the magnification converting lens is inserted.

Further, the image recording section has a construction for recording the picture image signal from the signal processing circuit as an image.

When the magnification converting lens is mounted (inserted), the picture image just before the mounting of the magnification converting lens is recorded to the image recording section as an image by this construction. When the magnification converting lens is inserted, the recorded image is displayed in the monitor. Accordingly, the disordered feeling felt by a user can be reduced.

Further, the signal processing circuit has a construction for electronically enlarging processing and outputting the image recorded to the image recording section.

When the magnification converting lens is mounted, the enlarged image can be displayed in the monitor by this construction. For example, when the magnification of the enlargement processing is set to the same enlargement ratio as the magnification converting lens, the user can grasp the angle of view after the mounting of the magnification converting lens without waiting for time required in the insertion of the magnification converting lens.

Further, the signal processing circuit has a construction for stepwise enlarging the image recorded to the image recording section.

In accordance with this construction, when the magnification converting lens is mounted, the image is displayed in the monitor while the image is stepwise sequentially enlarged in the mounting process of the magnification converting lens. Accordingly, the disordered feeling felt by the user can be further reduced.

Further, the image pickup device may comprise a variable power lens magnification sensor for detecting the image pickup magnification of the variable power lens, and the signal processing circuit may also stepwise enlarge and output the image recorded to the image recording section according to the ratio of a change of the image pickup magnification of the variable power lens detected by the variable power lens magnification sensor.

In accordance with this construction, when the magnification converting lens is mounted, the image is displayed while the image is stepwise enlarged according to the ratio of the change of the zoomed up magnification. Accordingly, the disordered feeling felt by the user can be further reduced.

Further, the signal processing circuit may also stepwise enlarge the image recorded to the image recording section according to a zoom operation.

In accordance with this construction, when the magnification converting lens is mounted, the image recorded to the image recording section is stepwise enlarged according to the zoom operation of an operator. Accordingly, the image can be outputted to the monitor in the way like an intention of the operator.

Further, the control section may also have a construction for changing the image pickup magnification of the variable power lens when the signal processing circuit stepwise enlarges and outputs the image.

In accordance with this construction, when the image is stepwise enlarged and outputted, the image pickup magnification of the variable power lens can be changed. When the enlargement magnification of the image and the enlargement magnification of the picture image from the image pickup element become equal, the picture image output can be switched to the picture image signal from the image pickup element. Accordingly, the output time of the image stepwise enlarged and displayed can be shortened as much as possible. The disordered feeling given to the user can be further reduced.

Further, the signal processing circuit may also have a construction in that, when the image from the image recording section is switched to the picture image from the image pickup element, the signal processing circuit synthesizes and processes the images from the image recording section and the image pickup element and outputs this synthesized and processed picture image. The switching from the image of the image recording section to the picture image of the image pickup element is performed when the insertion of the magnification converting lens is completed. In this case, the picture image switching may be started after the insertion completion. The picture image switching may be also started from slightly before the insertion completion.

In accordance with this construction, when the image from the image recording section is switched to the picture image from the image pickup element, the picture images are overlapped. The image pickup device outputs the picture image obtained by the synthesizing working processing such as sequentially changing the ratio of the overlap to the monitor. Accordingly, the disordered feeling given to the user can be reduced when switching time of the picture image.

The present embodiment also discloses an image pickup method. This image pickup method comprises a step for inserting and mounting a magnification converting lens for converting image pickup magnification into a predetermined multiple on the optical axis of an image pickup element and a variable power lens; a step for recording a picture image signal from a signal processing circuit to an image recording section as an image; and a step for switching a picture image from the image pickup element to the image recorded to the image recording section and outputting the switched image; wherein the switched image is outputted to a monitor when the magnification converting lens is inserted onto the optical axis.

Instead of the frame body of the magnification converting lens, the image is displayed in the monitor at the inserting time of the magnification converting lens by this construction. Accordingly, the disordered feeling felt by the user can be reduced.

As mentioned above, in accordance with this embodiment, the frame body of the magnification converting lens crossing an optical path is not displayed in the monitor when inserting the magnification converting lens. Accordingly, the effect in which a disordered feeling is not given to the user, or reducing this feeling is obtained.

The image pickup device of the embodiment of the present invention will next be explained by using the drawings.

FIG. 1 is a block diagram showing the construction of the image pickup device (imaging device or photographing device) of this embodiment. In FIG. 1, the image pickup device has a lens section 10, an image pickup element 20, a signal processing circuit 30, an image recording section 31, a control section 40 and an operating section 50.

The lens section 10 is mainly constructed by a first group lens 11, a variable power lens 12, a diaphragm portion 13, a focus lens 14, an extender 15 as a magnification converting lens, a variable power lens magnification sensor 16, a variable power lens driving section 17 and an extender driving section 18. The first group lens 11, the variable power lens 12, the diaphragm portion 13 and the focus lens 14 are arranged on the optical axis L of the image pickup element 20 (the optical axis L of the lens group, i.e., an optical system).

The variable power lens 12 is a lens continuously changed with respect to the focal distance. The diaphragm portion 13 is a circuit for adjusting exposure. The extender 15 is a magnification converting lens. When the focal distance of the variable power lens 12 is insufficient, the extender 15 is inserted onto the optical axis L of the image pickup element 20 and can extend the focal distance. The variable power lens magnification sensor 16 is constructed so as to detect which magnification the variable power lens 12 is set to. The variable power lens driving section 17 changes the focal distance of the variable power lens 12 according to the operation of an operator. The extender driving section 18 is constructed so as to insert the extender 15 onto the optical axis L of the image pickup element 20.

Further, the image pickup element 20 generates a picture image signal from an optical signal from the lens section 10. The signal processing circuit 30 outputs the picture image signal from the image pickup element 20 as a picture image signal for a monitor output. The image recording section 31 is constructed so as to record an image. The image recording section 31 can output the recorded image to the signal processing circuit 30. Further, the image recording section 31 can record an image signal inputted from the signal processing circuit 30. The control section 40 controls the operations of the variable power lens driving section 17, the extender driving section 18, the signal processing circuit 30, etc. in accordance with an operation from the operating section 50, etc.

Figure 2:
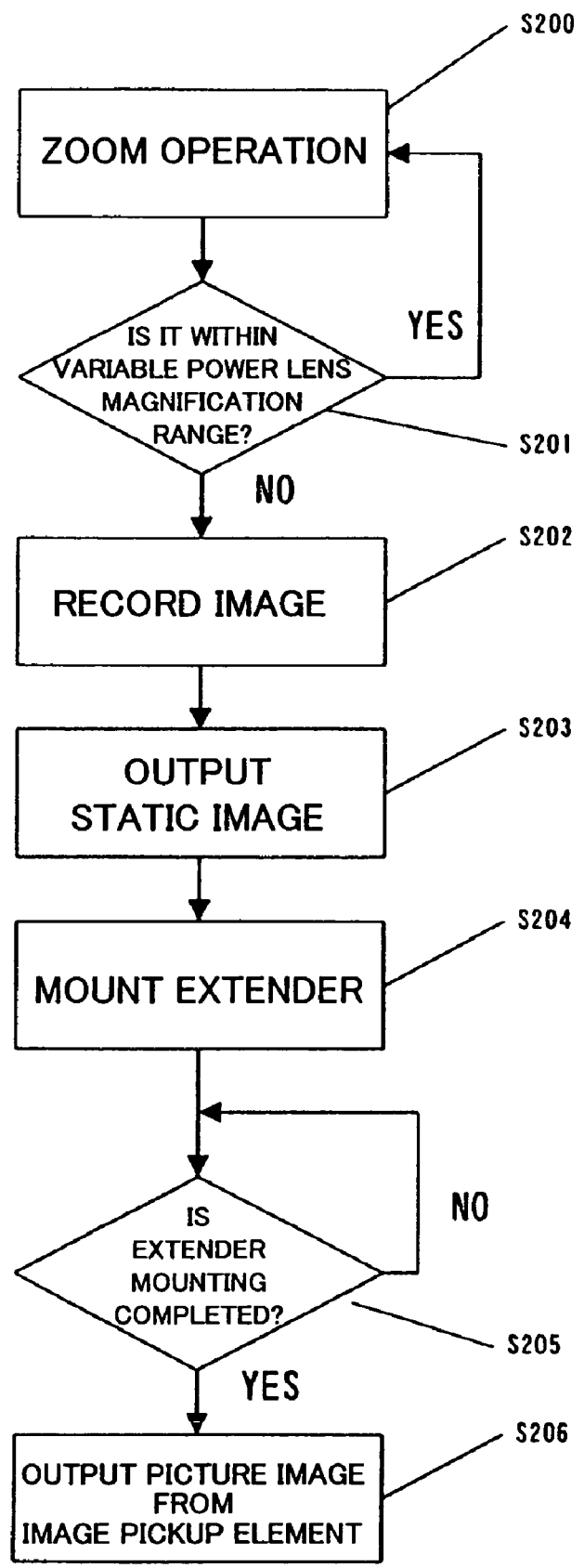
FIG. 2 is a flow chart for explaining the operation of the image pickup device of the present invention.

Next, the operation of the above image pickup device will be explained by using FIG. 2. When an operator wants to enlarge a picture image, a zoom operation is performed with respect to the operating section 50 (S200). When the zoom operation is performed, the control section 40 judges whether this operation (zoom magnification) lies within a magnification range of the variable power lens 12 or not (S201). If the zoom operation is an operation within the magnification provided by the variable power lens 12, the zoom operation is performed without inserting the extender 15.

On the other hand, when the control section 40 judges that the zoom operation is an operation for exceeding the magnification provided by the variable power lens 12 (S201, NO), the control section 40 sends a signal of this judgment to the signal processing circuit 30. The signal processing circuit 30 then records the picture image from the image pickup element 20 to the image recording section 31 as a static image (S202), and an image based on the static image recorded to the image recording section 31 is outputted instead of the picture image from the image pickup element 20 (S203). Thereafter, the control section 40 controls the operation of the extender driving section 18, and inserts and mounts the extender 15 between the variable power lens 12 and the image pickup element 20 (S204).

The control section 40 judges whether the insertion of the extender 15 is completed or not (S205). When the insertion of the extender 15 is completed, the control section 40 sends a signal showing the insertion completion to the signal processing circuit 30. The output picture image of the signal processing circuit 30 is then switched from the image recorded to the image recording section 31 to the picture image of the image pickup element 20 (S206). The picture image of the image pickup element 20 is a picture image provided via the extender 15.

Thus, in the image pickup device of this embodiment, while the extender 15 is inserted, i.e., when the extender 15 is moved onto an optical path, the image recorded to the image recording section 31 is outputted. Accordingly, the frame body of the extender 15 crossing the optical path is not displayed in a monitor.

Next, the relation of the zoom operation and the image pickup magnification of the image pickup device in each embodiment will be explained by using FIGS. 3 to 8. In the following description, plural embodiments will be explained, and image processings in these embodiments are different from each other.

In each of FIGS. 3 to 8, the axis of abscissa shows time for performing the zoom operation, and the axis of ordinate shows the zoom magnification of the picture image outputted from the signal processing circuit 30. Further, $z_1$ is a maximum magnification provided by the variable power lens 12, and $z_2$ is a magnification multiplied by the magnification provided by the extender 15. Similarly, $t_1$ is a time point for starting the insertion of the extender 15, and $t_2$ is a time point for completing the insertion of the extender. Further, a thick line corresponds to a case in which the outputted picture image is a picture image from the image pickup element 20. A thin line corresponds to a case in which the outputted picture image is based on an image of the image recording section 31. In this explanation, the center of a subject is set to a reference in static image enlargement processing.

Figure 3:
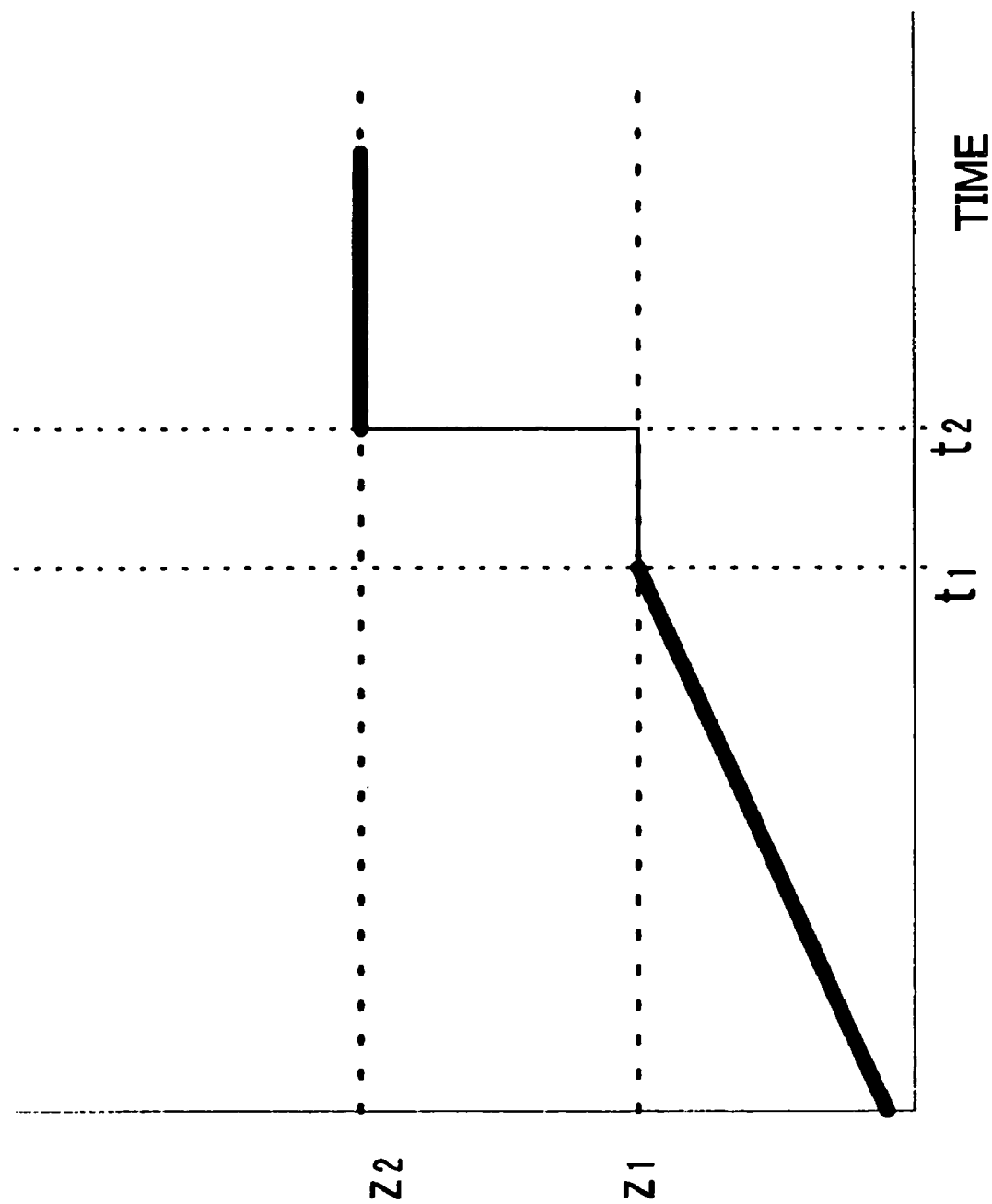
FIG. 3 is a view showing the relation of a time axis and the image pickup magnification of an output picture image in the image pickup device in accordance with a first embodiment of the present invention.

First, the relation of the zoom operation and the image pickup magnification of the image pickup device in a first embodiment will be explained by using FIG. 3. In FIG. 3, the magnification of the variable power lens 12 is enlarged by the zoom operation. The magnification of the variable power lens 12 exceeds the maximum magnification $z_1$ provided by the variable power lens 12 at time point $t_1$. In this case, the extender 15 is inserted onto the optical axis L at the corresponding time point $t_1$.

Time from time point $t_1$ to time point $t_2$ is an intermediate period for inserting the extender 15. The image pickup device outputs the picture image just before the insertion of the extender 15 during the time from time point $t_1$ to time point $t_2$. Namely, the picture image of magnification $z_1$ is outputted as a static image. Next, the picture image from the image pickup element 20 is outputted at time point $t_2$ at which the mounting of the extender 15 is completed. Namely, the picture image enlarged to magnification $z_2$ is displayed in the monitor.

In this embodiment, while the extender 15 is mounted, the magnification of the variable power lens 12 is not changed. The variable power lens 12 has already become the maximum magnification $z_1$. The magnification of the picture image outputted from the signal processing circuit 30 is magnification $z_2$ as it is, and is not further enlarged.

Figure 4:
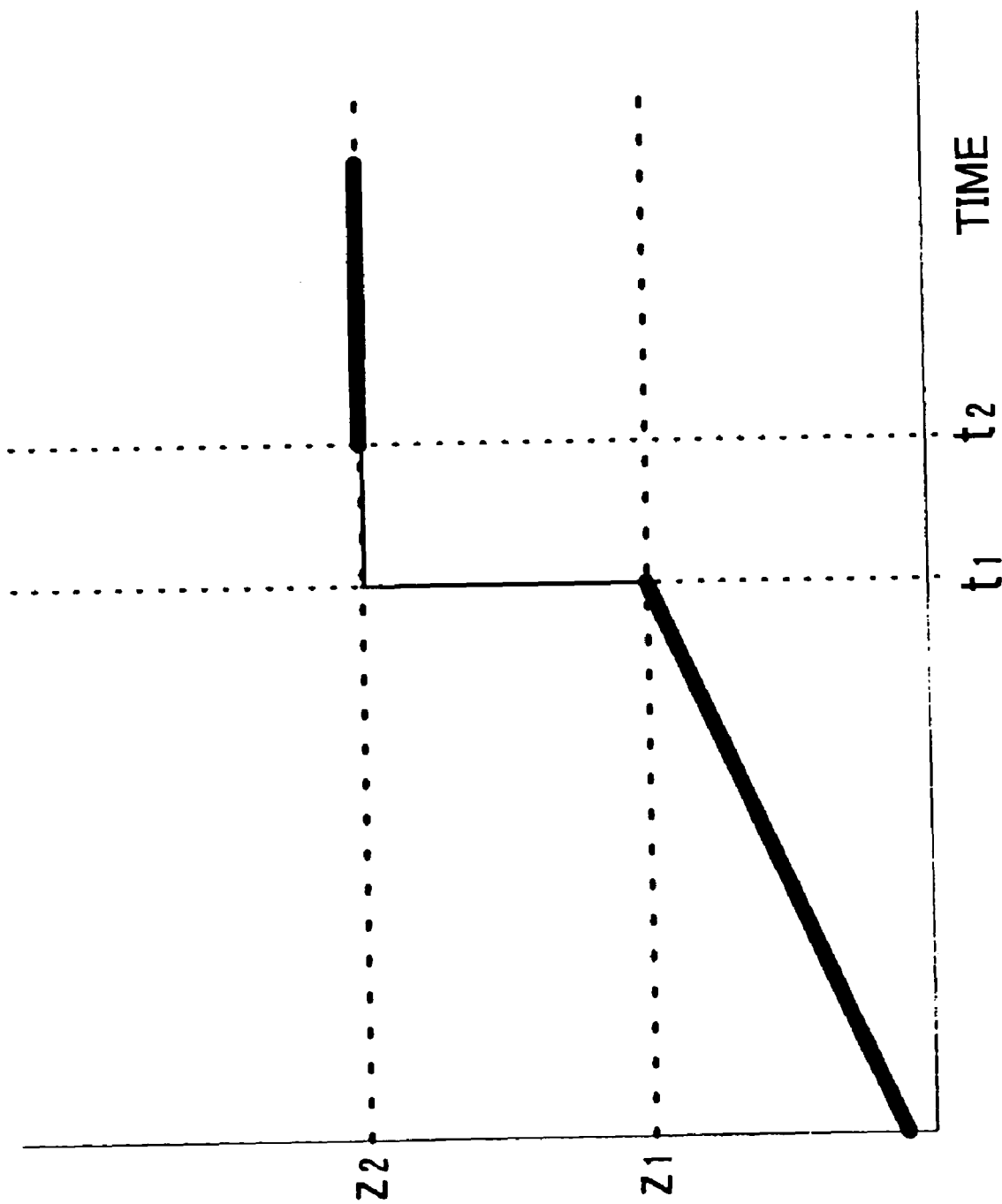
FIG. 4 is a view showing the relation of a time axis and the image pickup magnification of an output picture image in the image pickup device in accordance with a second embodiment of the present invention.

Next, a second embodiment of the present invention will be explained by using FIG. 4. The second embodiment differs from the first embodiment in the following points. In FIG. 4, the time from time point $t_1$ to time point $t_2$ is a period in which the extender 15 is inserted onto the optical axis L. In the second embodiment, the signal processing circuit 30 performs processing for enlarging and working the image of the image recording section 31 to magnification $z_2$ during the time from time point $t_1$ to time point $t_2$. The signal processing circuit 30 then outputs the image of magnification $z_2$ as a picture image.

Thus, in the image pickup device of this embodiment, when the extender 15 is inserted, the signal processing circuit 30 does not output the image recorded to the image recording section 31 as it is. The signal processing circuit 30 electronically enlarges and processes the image of the image recording section 31, and outputs the enlarged image to the monitor.

In this embodiment, for example, the magnification of the enlargement processing is set to the same magnification as the enlargement ratio of the extender 15. In this case, a user can grasp the picture image at the mounting time of the extender 15 without waiting for time required in the insertion of the extender 15.

Figure 5:
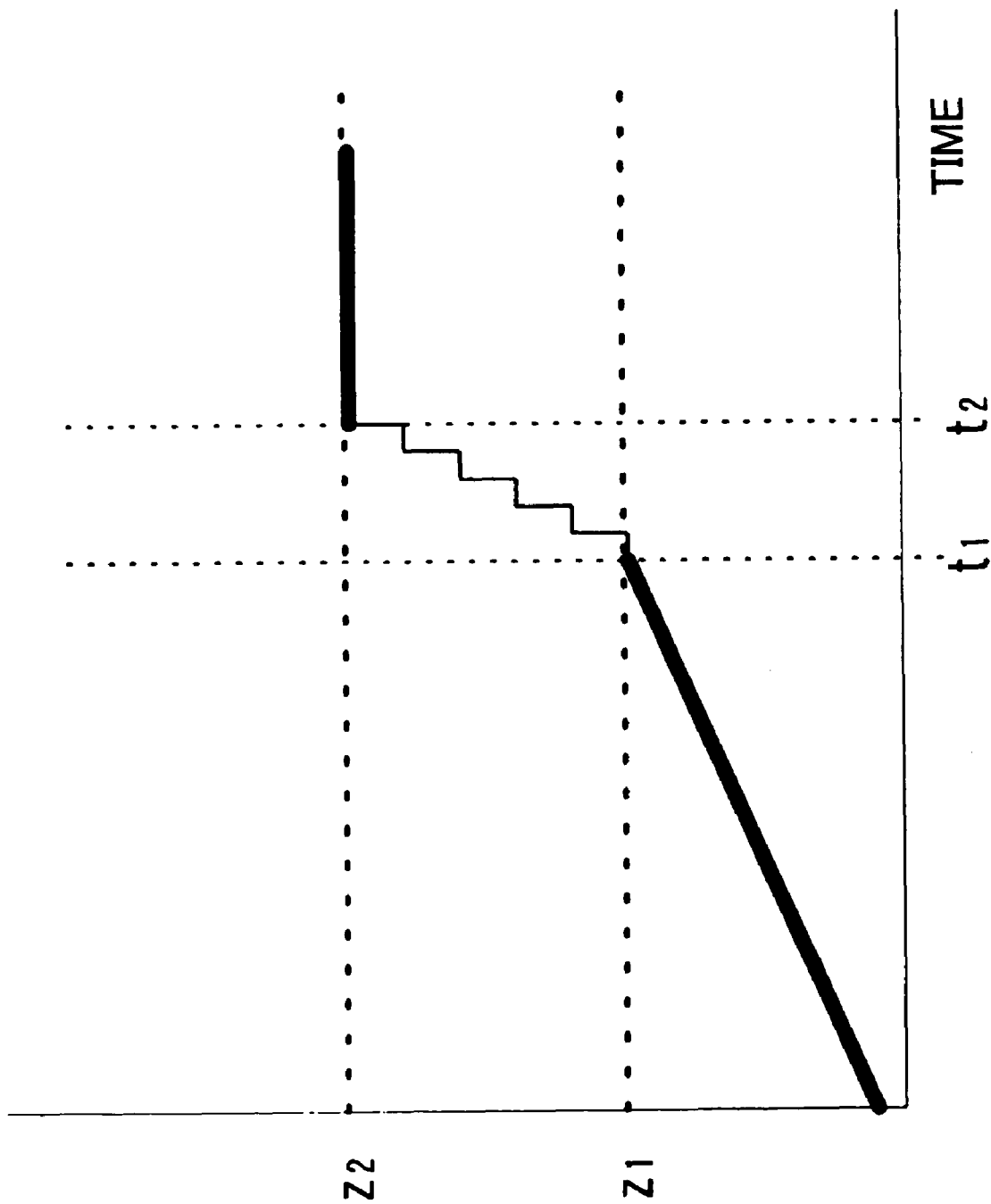
FIG. 5 is a view showing the relation of a time axis and the image pickup magnification of an output picture image in the image pickup device in accordance with a third embodiment of the present invention.

Next, a third embodiment of the present invention will be explained by using FIG. 5. The third embodiment differs from the second embodiment in that an image is stepwise enlarged and is sequentially outputted. This stepwise enlargement processing is also performed by the signal processing circuit 30 (hereinafter, the same). In FIG. 5, the time from time point $t_1$ to time point $t_2$ is a period for inserting the extender 15 onto the optical axis L. In this embodiment, working processing for stepwise enlarging the image from the image recorded just before the insertion of the extender to the image of magnification after the mounting of the extender is performed in the period from time point $t_1$ to time point $t_2$.

Similar to the first embodiment, the image of magnification $z_1$ is outputted at the time point $t_1$ for starting the insertion of the extender 15. The image sequentially stepwise enlarged is then outputted. In reaching time point $t_2$, the image pickup device outputs the picture image of magnification after the extender 15 is inserted. Namely, the picture image of magnification $z_2$ is outputted. The number of plural images stepwise outputted is determined by the time from time point $t_1$ to time point $t_2$ required in the insertion of the extender 15, and image generating ability of the signal processing circuit 30.

In this embodiment, image processing of plural patterns is considered. For example, the image of magnification $z_1$ may be outputted just after time point $t_1$. Otherwise, an image enlarged by one stage may be outputted. Further, the image of magnification $z_2$ may be outputted just before time point $t_2$. Otherwise, an image before by one stage (an image reduced in size by one stage) may be outputted.

In this embodiment, after the mounting of the extender 15 is completed, the picture image is switched from the image of the image recording section 31 to a signal of the image pickup element 20. In this embodiment, in switching this picture image, the enlargement of the image becomes continuous, and a disordered feeling given to a user can be reduced. In particular, when the center of a subject is not moved during the time from time point $t_1$ to time point $t_2$, the processing of this embodiment is effective.

Figure 6:
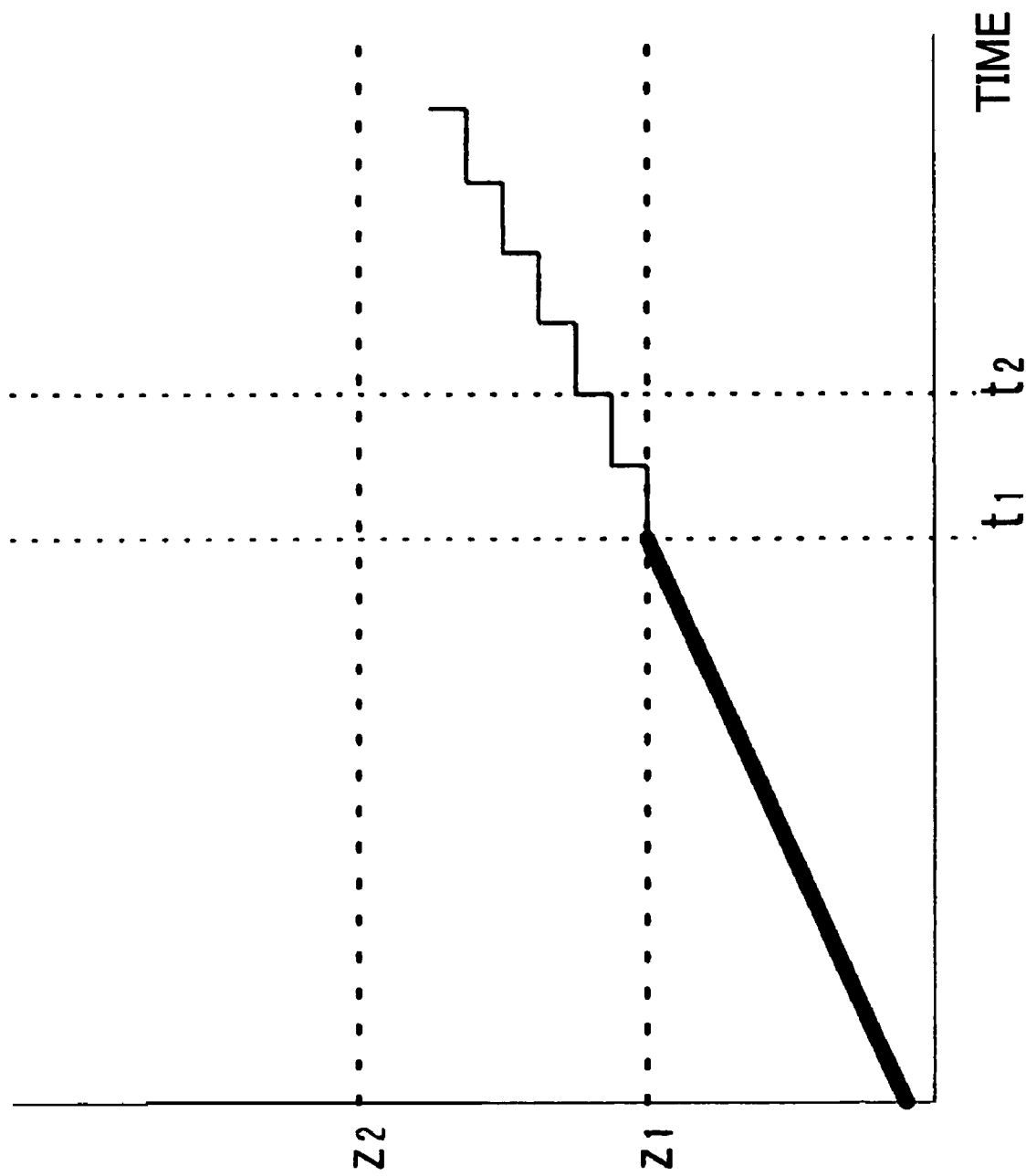
FIG. 6 is a view showing the relation of a time axis and the image pickup magnification of an output picture image in the image pickup device in accordance with a fourth embodiment of the present invention.

Next, a fourth embodiment of the present invention will be explained by using FIG. 6. The fourth embodiment differs from the third embodiment in the enlargement ratio of an image (a stepwise enlarged ratio or speed). In the third embodiment, the enlargement ratio was a ratio enlarged from magnification $z_1$ to magnification $z_2$ during the time from time point $t_1$ to time point $t_2$. In the fourth embodiment, the enlargement ratio at time point $t_1$ is maintained. The image is stepwise enlarged in the enlargement ratio at time point $t_1$.

Thus, in this embodiment, when the extender 15 is inserted onto the optical axis L, the image recorded to the image recording section 31 is outputted. Further, in this embodiment, the image is stepwise enlarged in conformity with the ratio of a change of the image pickup magnification of the variable power lens 12. Accordingly, a zooming-up speed becomes approximately equal before and after the mounting of the extender 15. Further, the screen of the zoom-up can be smoothly displayed. In particular, when large change is not generated in a subject, the picture image changed smoothly continuously can be outputted so that the processing of this embodiment is effective.

In this embodiment, the ratio of the magnification change may be a ratio of the change at time point $t_1$. Further, the ratio of the magnification change may be an average value of the ratio of the change from before a predetermined time to time point $t_1$.

Figure 7:
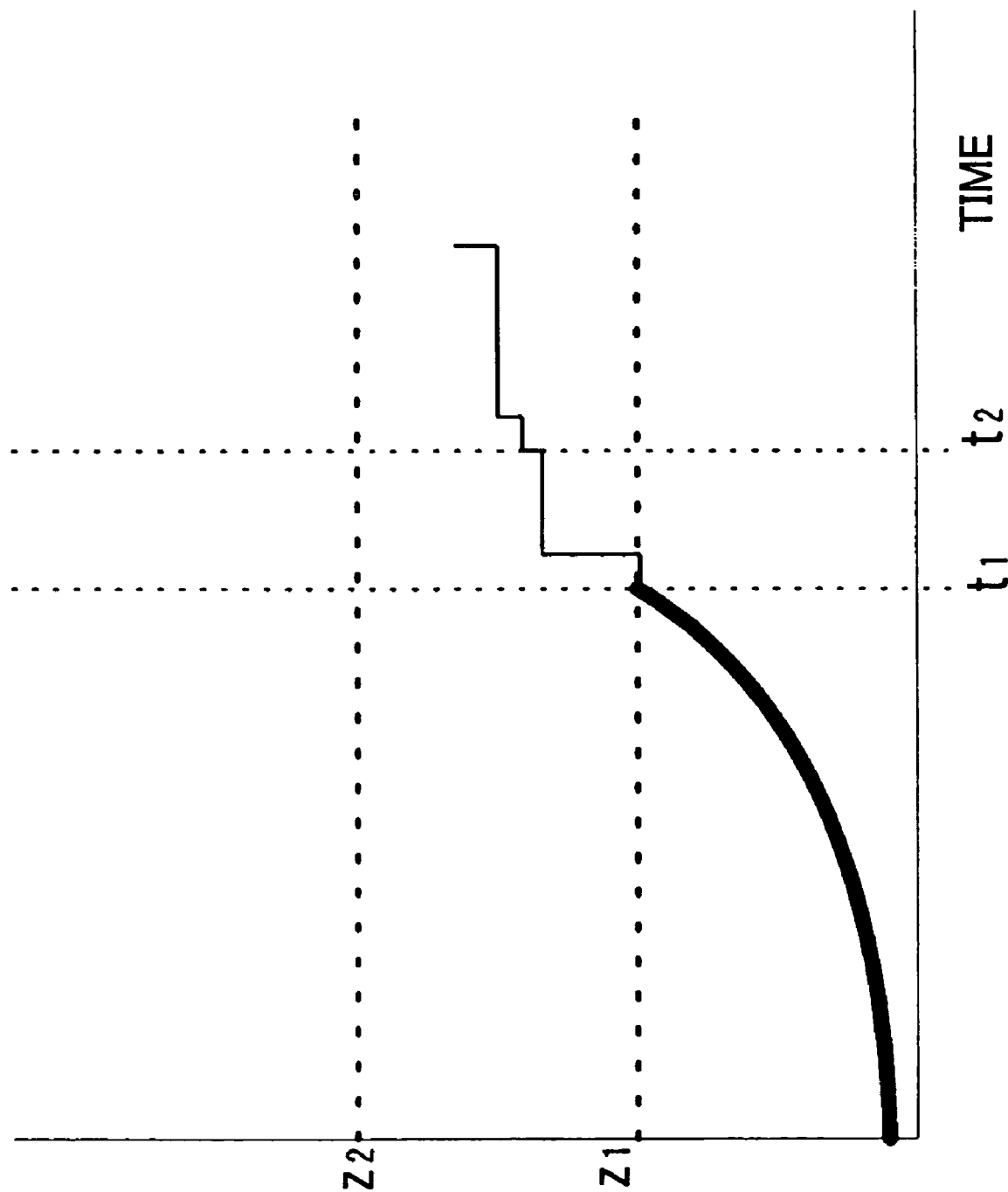
FIG. 7 is a view showing the relation of a time axis and the image pickup magnification of an output picture image in the image pickup device in accordance with a fifth embodiment of the present invention.

Next, a fifth embodiment of the present invention will be explained by using FIG. 7. In the fifth embodiment, the ratio for stepwise enlarging an image is variable in accordance with an operation. The fifth embodiment differs from the fourth embodiment in this respect. The control section 40 controls the operation of the signal processing circuit 30, and adjusts the enlargement ratio (enlargement speed), and differently sets the enlargement ratio (enlargement speed) of the image in accordance with an operation.

Thus, in this embodiment, the recorded image is outputted when the extender 15 is inserted onto the optical axis L. Further, in this embodiment, the image is stepwise enlarged according to the operation of an operator. The image can be outputted to the monitor by such processing in a way like an intension of the operator.

Next, a sixth embodiment of the present invention will be explained by using FIG. 8. In the sixth embodiment, the time (period) for outputting the picture image based on the image of the image recording section 31 is shortened in comparison with the fourth and fifth embodiments. Namely, in the sixth embodiment, processing for restarting the picture image output of the image pickup element 20 is performed earlier.

For example, when the sixth embodiment is compared with the fourth embodiment, the image pickup device in the fourth embodiment stepwise enlarges the image after time point $t_1$ in the ratio of a change of magnification at time point $t_1$. In the sixth embodiment, the magnification of the variable power lens 12 is simultaneously reduced as well as the enlargement processing of the fourth embodiment.

Figure 8:
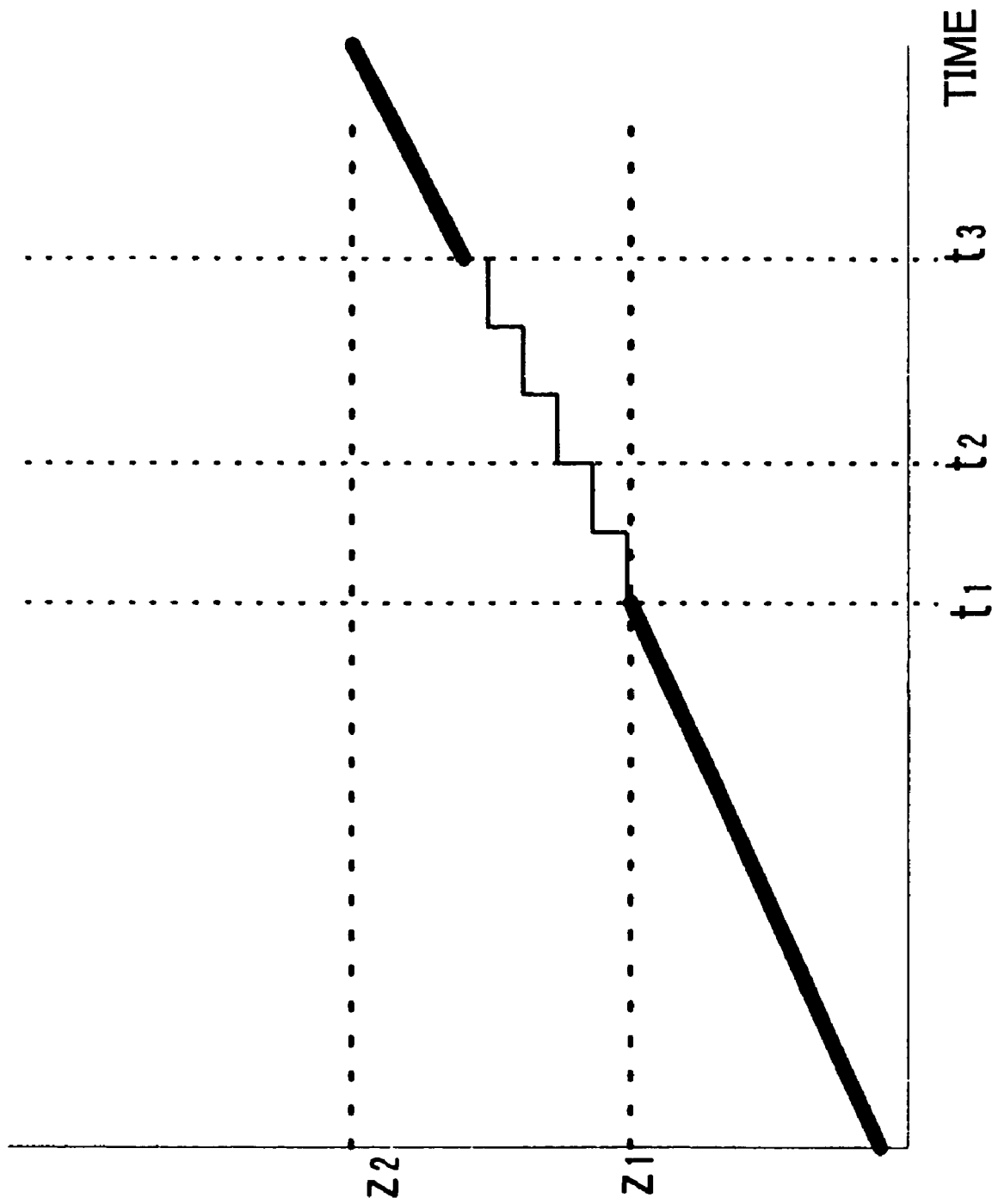
FIG. 8 is a view showing the relation of a time axis and the image pickup magnification of an output picture image in the image pickup device in accordance with a sixth embodiment of the present invention.
Figure 9C:
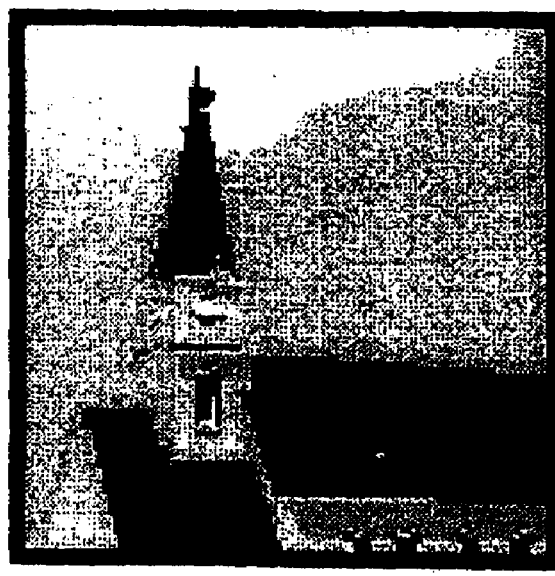
FIG. 9C is a view showing monitor display in the conventional image pickup device.

In FIG. 8, time point $t_3$ is a time point at which the magnification of the picture image of the image pickup element 20 becomes the same as the magnification of the enlargement processing with respect to the image of the image recording section 31 as a result of magnification control of the variable power lens 12. At time point $t_3$, the enlargement magnification of the image of the image recording section 31 does not yet reach magnification $z_2$. Further, since the insertion of the extender 15 is completed at time point $t_2$ before time point $t_3$, the image pickup element 20 generates a signal of the picture image obtained through the extender 15 at time point $t_3$. In the sixth embodiment, the output picture image is switched to the picture image of the image pickup element 20 at time point $t_3$. The sixth embodiment differs from the fourth embodiment in that such magnification reduction and earlier switching are performed.

Thus, the image pickup device of this embodiment outputs the image recorded to the image recording section 31 when the extender 15 is inserted. The image pickup device stepwise enlarges the image in accordance with the ratio of the change of the image pickup magnification of the variable power lens 12 just before the insertion, and the zoom operation. Simultaneously, the image pickup device changes the image pickup magnification of the variable power lens 12. When the enlargement magnification of the image and the enlargement magnification of the picture image from the extender 15 become equal to each other, the picture image output is switched to a signal from the image pickup element 20. In this embodiment, the output time of the image sequentially enlarged and displayed can be shortened as much as possible. Accordingly, the actual picture image can be more rapidly outputted.

In the sixth embodiment, the magnification of the variable power lens 12 is reduced as a physical operation on or after time point $t_1$ for outputting the image. It is necessary that the magnification of the variable power lens 12 becomes a predetermined magnification before time point $t_3$ so as to perform a stable zoom enlargement operation by the variable power lens 12. Such an operation can be realized by the control section 40. The control section 40 controls the operation of the variable power lens 12 on the basis of the enlargement ratio of the image outputted from the signal processing circuit 30 and being sequentially enlarged. The control section 40 controls the operation of the variable power lens 12 while the magnification during the operation of the variable power lens 12 is detected by the variable power lens magnification sensor 16. The control section 40 then calculates time point $t_3$ for switching the image of the image recording section 30 to the picture image from the image pickup element 20 on the basis of such information. Time point $t_3$ is calculated from the enlargement ratio of the image and the detecting magnification of the variable power lens 12. The control section 40 controls the operation of the signal processing circuit 30 to switch the output picture image at time point $t_3$.

Next, a seventh embodiment will be explained. In each of the above first to sixth embodiments, as the insertion of the extender 15 is completed, the image recorded to the image recording section 31 and the picture image from the image pickup element 20 are switched. This switching was simple switching in the above embodiments. In the seventh embodiment, this switching of the images is not simply performed, but special effect processing such as overlapping is added to the switching processing. Thus, in this embodiment, a disordered feeling given to a user can be further reduced.

The overlap processing is performed by the signal processing circuit 30. The signal processing circuit 30 synthesizes the picture image from the image pickup element 20 and the image read out of the image recording section 31, and generates an overlap image. The synthesizing processing is started when a notification of the insertion completion of the extender is received from the control section 40. The synthesizing processing is performed over a predetermined synthesizing period (overlap period). The ratio of the overlap is sequentially changed in this synthesizing period. The ratio of the picture image of the image pickup element 20 is sequentially increased. The ratio of the overlap may be continuously gradually changed. Thus, the image of the image recording section 31 is smoothly switched to the picture image of the image pickup element 20.

The synthesizing period may be also started from slightly before the insertion completion of the extender in a range having no problem about the disordered feeling in the overlap image. Since the ratio of the picture image of the image pickup element 20 is small at the initial stage of the overlap, it is considered that a disordered feeling is not generated even when the picture image before the insertion completion of the extender is mixed. In this case, the control section 40 sends instructions of the picture image switching to the signal processing circuit 30 at a predetermined time point before time point $t_2$. Such a construction is also included in the present invention.

Thus, in this embodiment, the signal processing circuit 30 synthesizes and processes the picture image from the image pickup element and the image from the image recording section, and outputs the synthesized and processed picture image. Advantages of this embodiment are as follows. At a time point for starting the insertion of the extender 15, the continuity of the picture image can be secured to a certain extent by outputting the picture image just before this time point. However, at a time point for completing the mounting of the extender 15, there is a case in which the image pickup device is panned and tilted and a subject has moved. Further, there is a case in which the subject is greatly changed. In such a case, in the above first to sixth embodiments, there is a case in which continuity of the picture image can not be obtained. In the seventh embodiment, both the picture images (the image of the image recording section 31 and the picture image of the image pickup element 20) are synthesized and outputted. Thus, the picture images are smoothly switched and the disordered feeling given to a user can be reduced. In this respect, the processing of this embodiment is effective.

As mentioned above, the preferred embodiments of the present invention given at present have been explained. However, it is understood that the present embodiments can be variously modified. Further, it is intended that the appended claims include all such modifications within the true spirit and scope of the present invention.

INDUSTRIAL APPLICABILITY

As mentioned above, the present invention has the effect that a disordered feeling is not given to a user seeing the monitor even at the inserting and detaching times of the magnification converting lens. The present invention is useful as an image pickup device able to insert and detach the magnification converting lens on the optical axis of the variable power lens.

The invention claimed is:
1. An image pickup device comprising
an image pickup element;
a variable power lens arranged on the same optical axis as said image pickup element and changing image pickup magnification;
a magnification converting lens arranged so as to be inserted and detached on said optical axis and converting the image pickup magnification into a predetermined multiple;
a signal processing circuit for outputting a signal from said image pickup element as a picture image signal;
an image recording section for recording an image; and
a control section for performing control for inserting and detaching said magnification converting lens on said optical axis;
wherein said signal processing circuit electronically enlarges the image recorded to said image recording section and outputs the electrically enlarged image during a transition time period of said magnification converting lens being inserted onto said optical axis.
2. The image pickup device according to claim 1, wherein said image recording section records the picture image signal from said signal processing circuit as an image.

3. The image pickup device according to claim 1, wherein, during the transition time period of said magnification converting lens being inserted onto said optical axis, said signal processing circuit stepwise enlarges and outputs the image recorded to said image recording section.

4. The image pickup device according to claim 1, comprising a variable power lens magnification sensor for detecting the image pickup magnification of said variable power lens, and wherein, during the transition time period of said magnification converting lens being inserted onto said optical axis, said signal processing circuit stepwise enlarges and outputs the image recorded to said image recording section according to the ratio of a change of the image pickup magnification of said variable power lens detected by said variable power lens magnification sensor prior to said transition time period.

5. The image pickup device according to claim 1, wherein, during the transition time period of said magnification converting lens being inserted onto said optical axis, said signal processing circuit stepwise enlarges the image recorded to said image recording section according to a zoom operation.

6. The image pickup device according to claim 4, wherein said control section changes the image pickup magnification of said variable power lens when said signal processing circuit stepwise enlarges and outputs said image.

7. The image pickup device according to claim 5, wherein said control section changes the image pickup magnification of said variable power lens when said signal processing circuit stepwise enlarges and outputs said image.

8. The image pickup device according to claim 1, wherein, when the image from said image recording section is switched to the picture image from said image pickup element, said signal processing circuit synthesizes and processes images from said image recording section and from said image pickup element, and said signal processing circuit outputs this synthesized and processed picture image to a monitor.

9. The image pickup device according to claim 8, wherein the synthesizing and processing performed by the signal processing circuit includes changing an overlap ratio of the images from said image recording section and from said image pickup element over a predetermined synthesizing period such that a ratio of the picture image from said image pickup element in the synthesized and processed picture image is gradually increased during the predetermined synthesizing period.

10. The image pickup device according to claim 1, wherein, during the transition time period of said magnification converting lens being inserted onto said optical axis, said signal processing circuit enlarges and outputs the image recorded to said image recording section according to the ratio of said magnification converting lens.

11. An image pickup method comprising
a step for inserting and mounting a magnification converting lens for converting image pickup magnification into a predetermined multiple on the optical axis of an image pickup element and a variable power lens;
a step for recording a picture image signal from a signal processing circuit to an image recording section as an image; and
a step for switching a picture image from said image pickup element to the image recorded to said image recording section;
wherein said switched image is electrically enlarged and the electrically enlarged image is outputted during a transition time period of said magnification converting lens being inserted onto said optical axis.

* * * * *

UNITED STATES PATENT AND TRADEMARK OFFICE
CERTIFICATE OF CORRECTION

PATENT NO. : 7,847,837 B2  
APPLICATION NO. : 10/578820  
DATED : December 7, 2010  
INVENTOR(S) : Yoshinori Ootsuna et al.

Page 1 of 1

It is certified that error appears in the above-identified patent and that said Letters Patent is hereby corrected as shown below:

On the first page of the patent item [54] and in column 1, please change the Title from "IMAGINE PICKUP DEVICE AND IMAGINE PICKUP METHOD" to --IMAGING PICKUP DEVICE AND IMAGING PICKUP METHOD--

Signed and Sealed this
Twenty-second Day of February, 2011

David J. Kappos
*Director of the United States Patent and Trademark Office*